United States Patent
Kragolnik

[11] Patent Number: 6,047,613
[45] Date of Patent: Apr. 11, 2000

[54] DRIVE DEVICE FOR THE MECHANICAL STAGE OF A MICROSCOPE

[75] Inventor: Karl Kragolnik, Moedling, Austria

[73] Assignee: Leica AG, Wien, Australia

[21] Appl. No.: 09/101,763

[22] PCT Filed: Dec. 3, 1996

[86] PCT No.: PCT/EP96/05357

§ 371 Date: Jul. 20, 1998

§ 102(e) Date: Jul. 20, 1998

[87] PCT Pub. No.: WO97/26576

PCT Pub. Date: Jul. 24, 1997

[30] Foreign Application Priority Data

Jan. 19, 1996 [DE] Germany ............... 296 00 887 U

[51] Int. Cl.$^7$ ............ G05G 11/00; A47B 11/00; G02B 21/26
[52] U.S. Cl. ............ 74/490.13; 108/143; 359/393
[58] Field of Search ............ 74/490.09, 490.13, 74/89.11, 89.21, 89.22; 108/143, 137; 474/85, 86; 359/393

[56] References Cited

U.S. PATENT DOCUMENTS

| | | | |
|---|---|---|---|
| 3,572,888 | 3/1971 | Kawashima | 359/393 |
| 4,189,953 | 2/1980 | Volk | 108/143 X |
| 4,402,576 | 9/1983 | Stahl et al. | |
| 4,552,033 | 11/1985 | Marzhauser | 74/490.13 |
| 4,700,585 | 10/1987 | Marzhauser | |
| 5,228,357 | 7/1993 | Dosaka | 108/143 X |
| 5,263,384 | 11/1993 | Suzuki | 74/490.13 |
| 5,440,944 | 8/1995 | Chen | 74/89.21 |
| 5,460,059 | 10/1995 | Kato | 74/89.22 |
| 5,615,577 | 4/1997 | Chen | 74/89.21 |
| 5,802,925 | 9/1998 | Kanao | 74/490.13 |
| 5,828,198 | 10/1998 | Engelse et al. | 359/393 X |

FOREIGN PATENT DOCUMENTS

| | | |
|---|---|---|
| 30 27 461 | 2/1982 | Germany. |
| 33 18 959 | 12/1983 | Germany. |
| 35 14 431 | 1/1986 | Germany. |
| 35 28 615 | 2/1987 | Germany. |

*Primary Examiner*—Tamara L. Graysay
*Assistant Examiner*—Brandon C. Stallman
*Attorney, Agent, or Firm*—Foley & Lardner

[57] ABSTRACT

The invention concerns a drive device for the mechanical stage (1) of a microscope, said device having a stationary base plate (2) and slides (3, 4) which are disposed thereon, are movable in the X and Y directions and are used to position an object to be examined. Secured on each of the slides (3, 4) is a rack (5, 6) which is drivingly connected in each case to a drive pinion (7, 8). Two superimposed control knobs (9) are provided on the microscope mechanical stage (1) for manually manipulating the drive device. Disposed in each case between the control knobs (9) and the respective drive pinion (7, 8) is a transmission element in the form of a toothed belt (10, 11) which transmits the rotational movement at the control knobs (2) to the respective drive pinion (7, 8).

4 Claims, 2 Drawing Sheets

DRIVE DEVICE FOR THE MECHANICAL STAGE OF A MICROSCOPE

The innovation relates to a drive device for a mechanical stage of a microscope, in accordance with the preamble of Patent claim 1.

Known mechanical stages of a microscope have a base plate which is arranged in a fixed manner and two carriages which are connected thereto. The carriages serve to position the object which is to be viewed and are designed so as to be displaceable in the X and Y directions. Coaxially arranged rotary knobs are provided on the mechanical stage of a microscope as manually operated elements for adjusting the carriages and are connected to the carriages via a gear mechanism.

Such a drive device is described in DE 35 28 615 A1. The control knobs are connected to toothed racks via two individual, coaxially arranged shafts and to drive pinions. The toothed racks are fixedly arranged on the carriage so that the rotational movement on the respective control knob is transmitted directly to the carriage. In order to implement the largest possible displacement path for the two carriages and, in doing so, to ensure constant precision in the guidance over the entire displacement travel, the toothed racks are dimensioned so as to be larger than the respective carriages. However, this results in the toothed racks protruding beyond the carriages, so that a relatively large amount of space is required for the mechanical stage of the microscope.

DE 30 27 461 A1 discloses a drive device which, in addition to the pinion toothed-rack links has a rapid adjustment feature for the microscope stage. For this purpose, the coaxially arranged shafts of the control knobs are provided with friction wheels which are operatively connected to the pinion toothed-rack link. As a result of these friction wheels, rapid adjustment of a mechanical stage of the microscope is possible by means of a separate manually operated element.

The dimensions of microscope mechanical stages used for inspecting semiconductors have grown owing to the increasing sizes of wafers and/or masks. However, as a result of this the known toothed-rack drives require an increasing amount of space so that it has become difficult to integrate such a microscope in a production line.

A microscope mechanical stage with an integrated drive is known from DE 35 14 431 A1. This document discloses a drive which implements the adjustment of the carriages on the mechanical stage by means of Bowden cables which are deflected repeatedly. In order to configure this drive with as little play as possible, the Bowden cables are prestressed by means of spring means. However, with this drive it is not possible to exclude the possibility of slip arising between the Bowden cables and the drive rollers and consequently no precise guidance or adjustment of the mechanical stage is possible.

DE 33 18 959 A1 discloses a drive device, of largely play-free design, for the supporting slide on a microscope stage in which the supporting slide can be positioned in the X and Y directions by means of a holder. Two rotatably mounted threaded spindles are connected as drive to the supporting slide, the threaded spindles being in each case connected to a motor drive by means of flexible shafts. However, manual adjustment is not possible with this drive device.

The object of the present innovation is therefore, based on the known prior art, to develop a drive device for a mechanical stage of a microscope, having a precise pinion toothed-rack guidance and a large carriage displacement area, such that the toothed racks are integrated completely in the mechanical stage of the microscope.

According to the innovation, this object is achieved by means of the features specified in the characterizing part of claim 1. Further advantageous developments of the innovation form the subject matter of the subclaims.

The innovation will be explained in more detail with reference to an exemplary embodiment and by means of the schematic drawings, in which.

Figure 1:
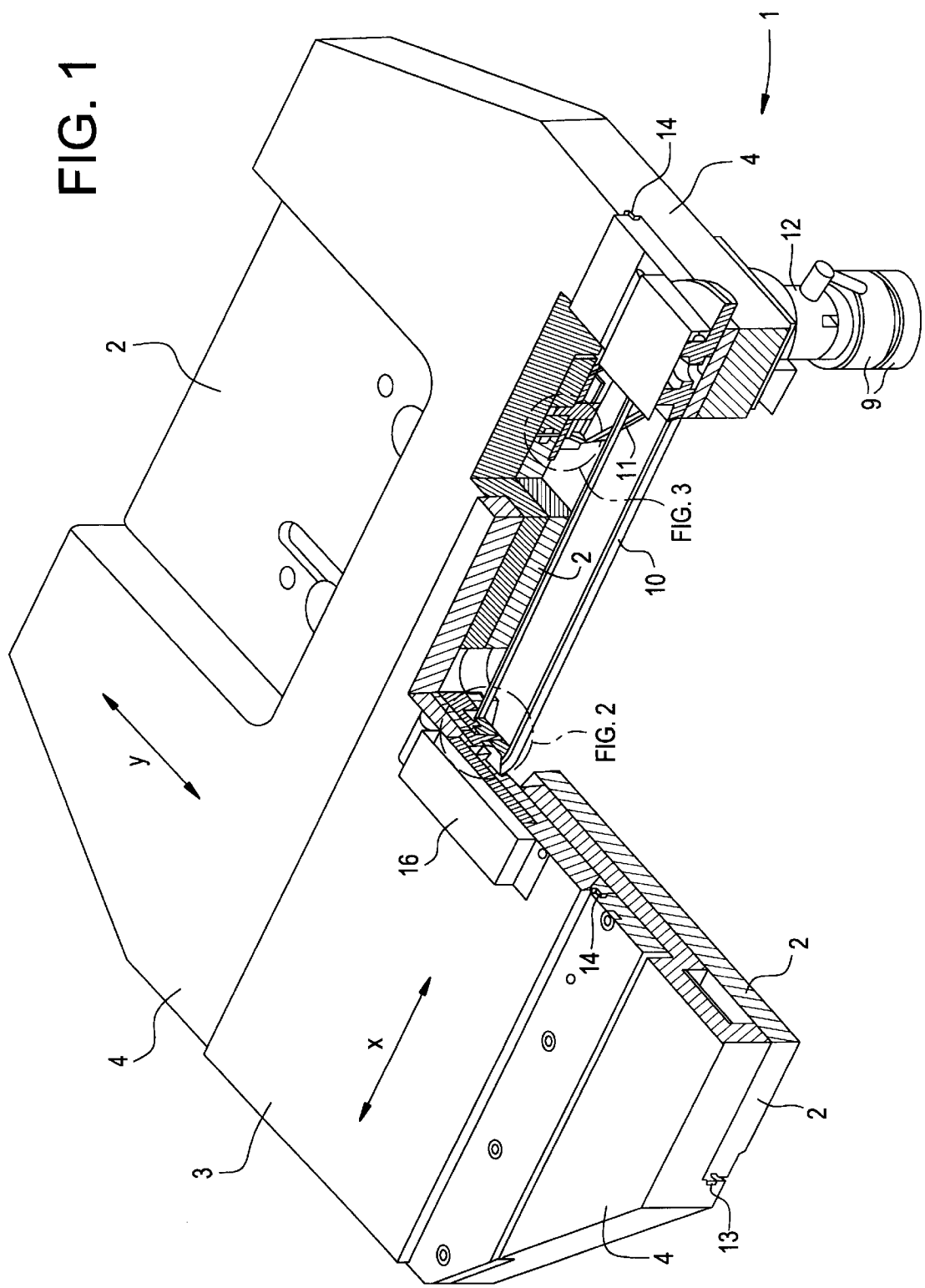
FIG. 1 shows a view of the mechanical stage of a microscope.

FIG. 1 shows a mechanical stage 1 of a microscope, having a fixed base plate 2 which is arranged on a microscope stand (not illustrated with it). A Y carriage 4 is displaceably mounted on this base plate 2. The bearings are preferably cross-roller bearings 13. Attached to the Y carriage 4 are two coaxially arranged rotary knobs 9 which are connected to in each case one deflection roller (not illustrated with it) via a kinematic link 12. The design of the rotary knobs 9 and the design of the kinematic link are not the subject of the innovation and correspond to the design in DE 30 27 461 A1.

The two deflection rollers of the kinematic link 12 each have a toothed belt 10 and 11, the toothed belt 11 being linked to a deflection roller 18 for the Y drive. The deflection roller 18 is permanently assigned a drive pinion 8.

The X carriage 3 is arranged on the Y carriage 4 by means of cross-roller bearings 14 in such a way that when the Y carriage 4 moves the X carriage 3 is also moved in the Y direction. The position of the Y carriage 4 is not changed when the X carriage 32 moves. The X carriage 3 is driven in a way equivalent to the drive of the Y carriage 4, the toothed belt 10 being linked to the deflection roller 17 to which a drive pinion 7 is permanently assigned. The drive pinion 7 with the deflection roller 17 is protected against external influences by a cover plate 16.

If toothbelts are used for both drives, it is of course advantageous if the deflection rollers of the kinematic link and the deflection rollers 17 and 18 are equipped with a corresponding toothing in order to exclude the possible occurrence of slip between the deflection roller and toothed belt.

The kinematic link 12 with the control knobs 9 and deflection rollers attached thereto are attached in a stationary fashion to the Y carriage 4, together with the associated deflection rollers 17 and 18 for the X and Y carriages, with the result that a movement of the two carriages 3 and 4 does not result in a change in length of the toothed belts 10 and 11.

Figure shows a detail from FIG. 1 in the region of the deflection roller 17. The deflection roller 17 with the toothed belt 10 is permanently linked to the drive pinion 7 and attached to the Y carriage 4 via the two cross-roller bearings 14. The drive pinion 7 is operatively connected to a toothed rack 5 which is permanently linked to the X carriage. Rotation of the drive pinion 7 causes the associated toothed rack 5 to roll on the pinion 7, so that the X carriage 3 is moved.

Figure 2:
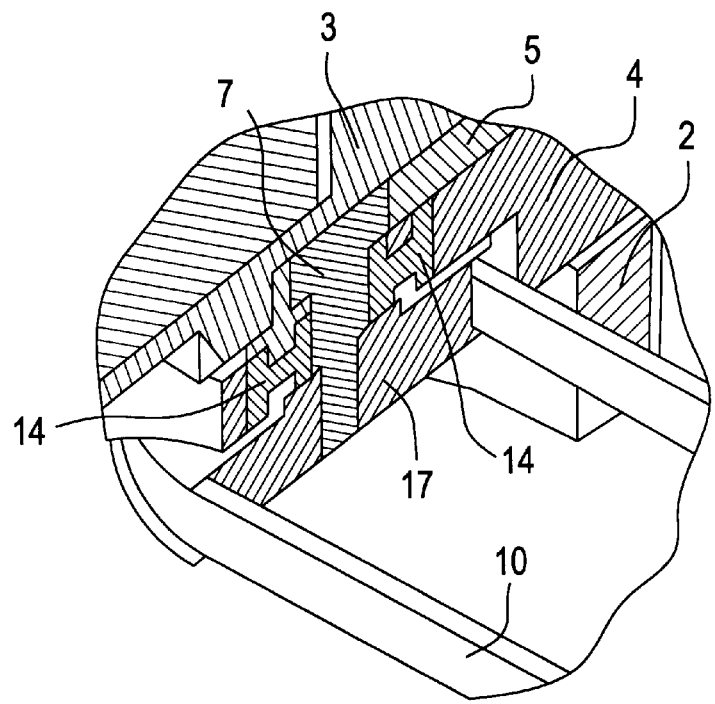
FIG. 2 shows a detail from FIG. 1 in the region of the X adjustment.
Figure 3:
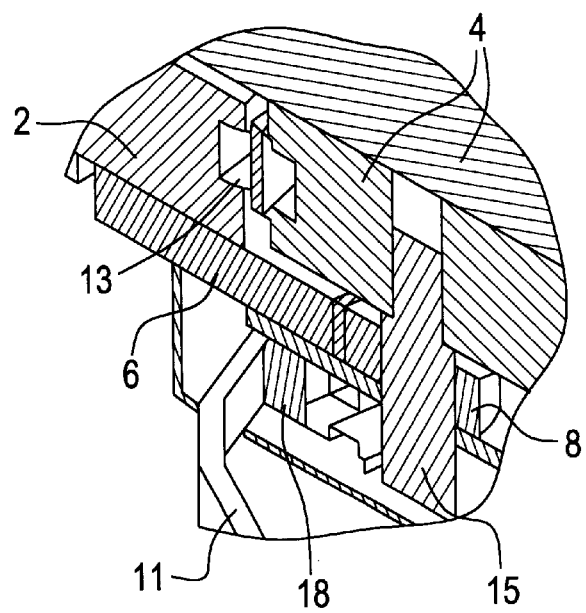
FIG. 3 shows a detail from FIG. 1 in the region of the Y adjustment.

By analogy with FIG. 2, FIG. 3 shows a detail from FIG. 1 in the region of the deflection roller 18. The deflection roller 18 with the toothed belt 11 is permanently linked to the drive pinion 8 via a bearing pin 15 and is attached to the Y carriage 4 via the cross-roller bearing 13. The drive pinion 8 is operatively connected to the toothed rack 6, which is permanently arranged on the base plate 2. Rotation of the deflection roller 18 causes the drive pinion 8 to roll on the associated toothed rack 6, so that the Y carriage 4 is moved.

LIST OF REFERENCE NUMERALS

1—mechanical stage of a microscope
2—base plate
3—X carriage
4—Y carriage
5—toothed rack on 3
6—toothed rack on 4
7—drive pinion for 5
8—drive pinion for 6
9—rotary knobs
10—toothed belt for 7
11—toothed belt for 8
12—kinematic link
13—cross-roller bearing
14—cross-roller bearing
15—bearing pin
16—cover plate
17—deflection roller for 10
18—deflection roller for 11

I claim:

1. Drive device for a mechanical stage of a microscope having a base plate which is arranged in a stationary fashion, said drive device comprising two carriages adapted to be arranged on said base plate, said carriages can move in the X and Y directions in order to position an object which is to be examined, there being attached to each of the two carriages a toothed rack which is kinematically linked in each case to a drive pinion, and two rotary knobs, which are arranged one above the other, being provided as manually operated elements for the drive device, and rotational movement of said rotary knobs is transmitted to the drive pinions via a gear mechanism wherein the drive pinions are each connected to a deflection roller, a circulating transmission element is provided between the gear mechanism and each deflection roller, and each circulating transmission element transmits the rotational movement at the rotary knobs to the respective drive pinion via the respective deflection roller.

2. Drive device for a mechanical stage (1) of a microscope according to claim 1, wherein the toothed racks (5, 6) are adapted to be arranged in the interior of the mechanical stage (1) of a microscope.

3. Drive device for a mechanical stage (1) of a microscope according to claim 1, wherein the circulating transmission elements (10, 11) are in the form of toothed belts.

4. Drive device for a mechanical stage of a microscope according to claim 2, wherein the circulating transmission elements are in the form of toothed belts.

* * * * *